United States Patent [19]

Mouille

[11] 4,053,258

[45] Oct. 11, 1977

[54] TAIL-ROTOR ARRANGEMENT FOR ROTOR CRAFTS

[75] Inventor: René Louis Mouille, Aix-en-Provence, France

[73] Assignee: Societe Nationale Industrielle Aerospatiale, Paris, France

[21] Appl. No.: 608,215

[22] Filed: Aug. 27, 1975

[30] Foreign Application Priority Data

Sept. 19, 1974 France .............................. 74.31664

[51] Int. Cl.² .......................................... B64C 27/38
[52] U.S. Cl. .................................. 416/134 A; 416/141
[58] Field of Search ................... 416/134, 134 A, 141, 416/148, 135, 138, 226, 132

[56] References Cited

U.S. PATENT DOCUMENTS

| 2,369,048 | 2/1945 | Hays ..................................... 416/134 |
| 2,830,669 | 4/1958 | Klockner .......................... 416/141 X |
| 3,002,569 | 10/1961 | Doblhoff ............................. 416/148 |
| 3,193,019 | 7/1965 | Drees et al. ..................... 416/141 X |
| 3,231,222 | 1/1966 | Scheutzow .................. 416/134 A X |
| 3,261,407 | 7/1966 | Culver et al. ..................... 416/112 |
| 3,484,174 | 12/1969 | McCoubrey ...................... 416/132 |
| 3,669,566 | 6/1972 | Bourquardez et al. ........... 416/134 |
| 3,874,815 | 4/1975 | Baskin ............................. 416/134 A |
| 3,880,551 | 4/1975 | Kisovec ............................ 416/134 |

FOREIGN PATENT DOCUMENTS

| 752,142 | 9/1933 | France ............................. 416/132 |
| 880,590 | 10/1961 | United Kingdom ............. 416/132 |

*Primary Examiner* — Everette A. Powell, Jr.

[57] ABSTRACT

The invention relates to a two-bladed tail rotor arrangement for gyroplanes and helicopters, comprising two plates fixed to a rotary shaft, between which are embedded the median portion of a flat flexible spar. On the ends of the said spar are fitted two shells which form the rotor blades and whose cross-section evolves in the blade root area to become circular, whereby the said shells are terminated by cylindrical sleeves fixed by bonding to flanges which are connected by elastic blocks to two plates. The rotor boss assembly can be provided with a cylindrical fairing.

10 Claims, 7 Drawing Figures

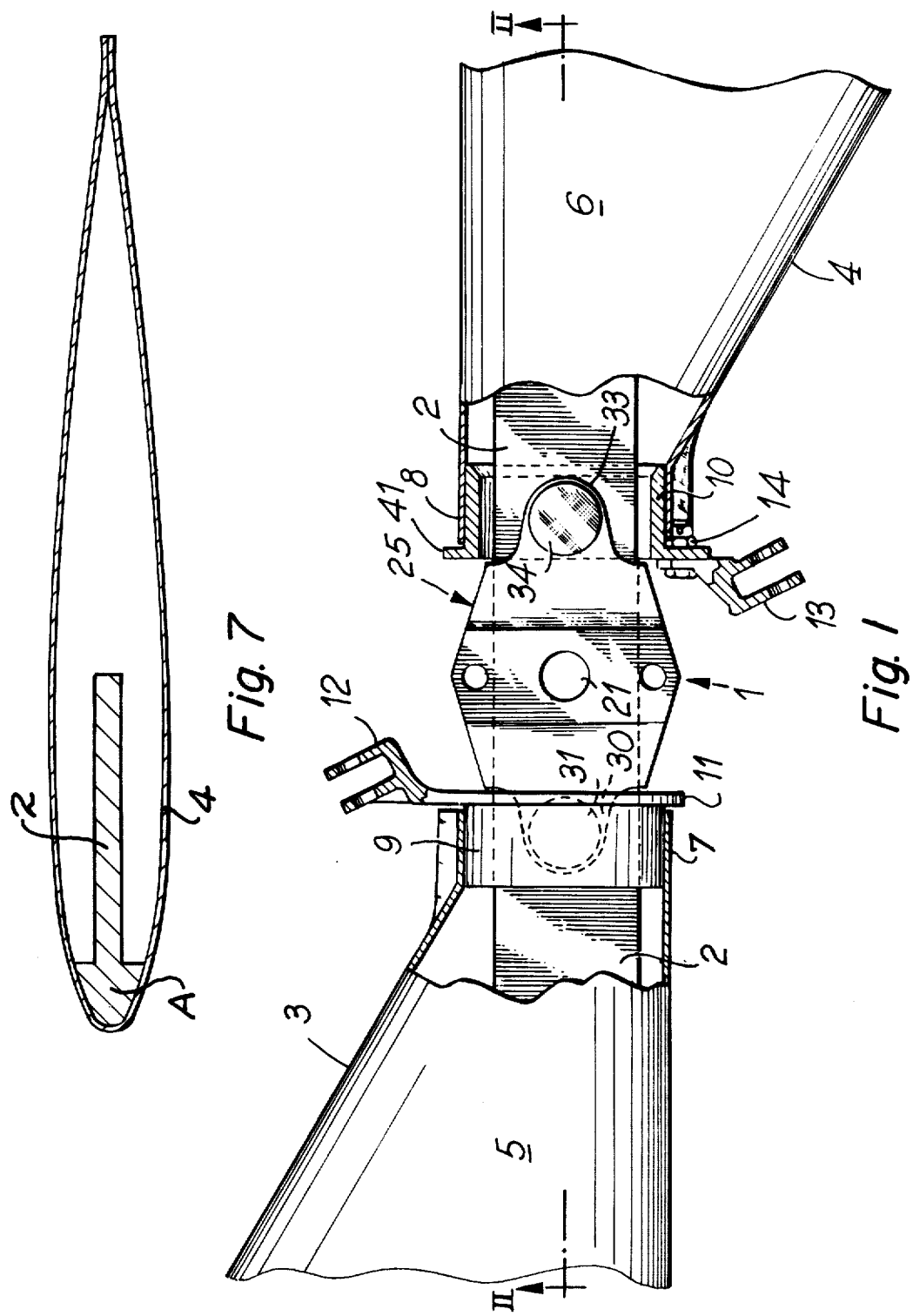

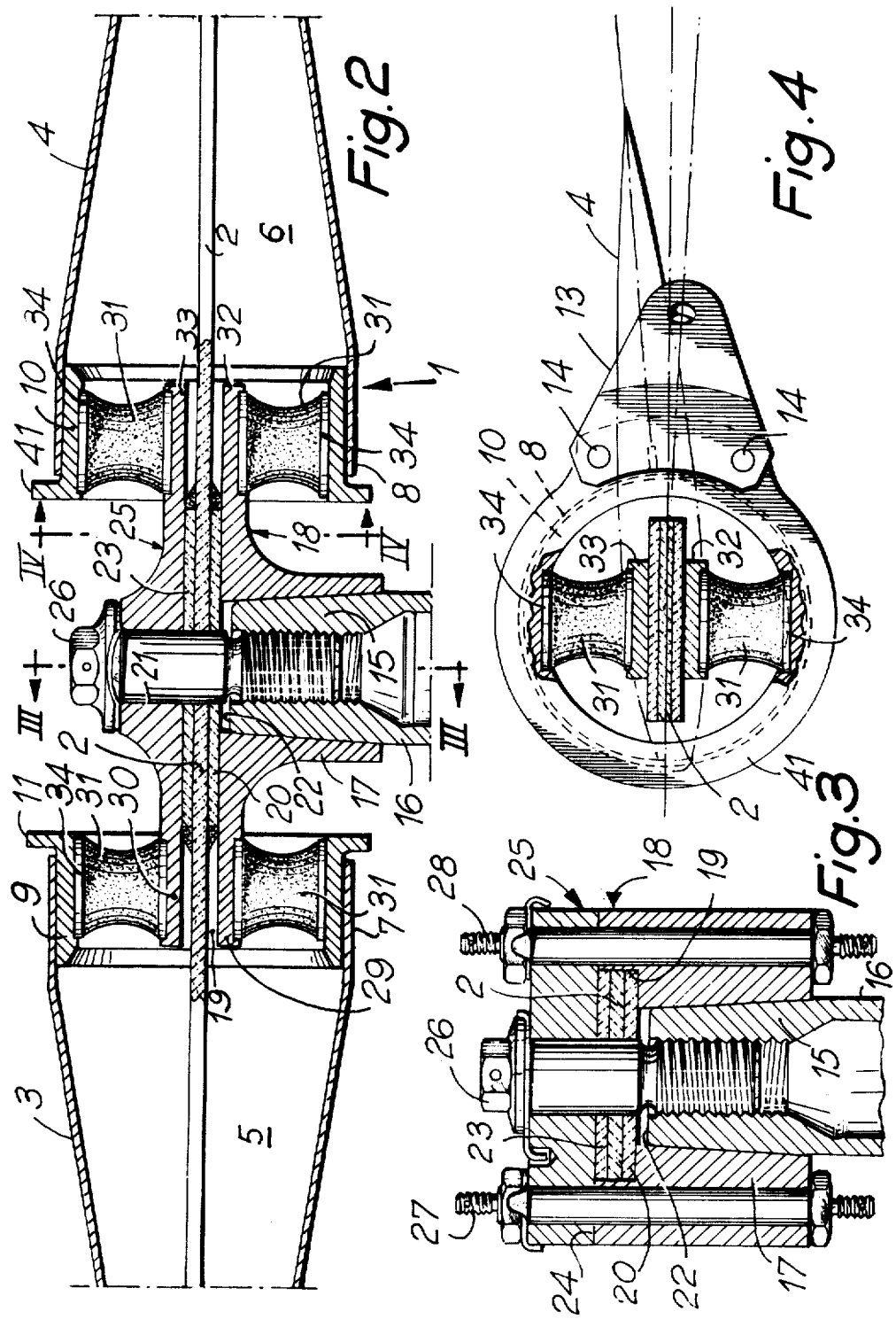

TAIL-ROTOR ARRANGEMENT FOR ROTOR CRAFTS

The present invention has for its object a tail rotor arrangement for aircraft having rotary aerofoils which is particularly advantageous due to the extremely simple construction of the rotor, its very low manufacturing costs and by the almost total elimination of maintenance.

Among the numerous types of tail rotors for helicoptors operating with a free airscrew, rotors having two or more blades articulated separately in hunting and in incidence are particularly known. These articulated rotors have the disadvantage of being relatively complicated because their hunting and incidence joints have ball, needle or roller bearings which have to be carefully lubricated to prevent deteriorating in operation. In actual fact these joints are not only subject to high centrifugal loads emanating from the blades, but they are also subject to oscillatory movements which aid brinelling of the bearings.

Another known type of opposing torque helicopter rotor comprises so-called "in balance" two-bladed rotors with a single hunting joint for the two blades, which are moreover articulated separately in incidence.

In these rotors the two blades are generally rigidly embedded relative to one another. In such a construction the blades are subject to constant high bending moments at their sockets or roots.

In another construction, simplifications have been made to the in balance opposing torque rotor by mounting the hunting joint on a self-lubricating ring and by using self-lubricating ball joints for the incidence joints which also serve as blade attachments. However, these ball joints are subject to high loads through the centrifugal forces from the blades and are therefore prone to very rapid wear.

Moreover, with the same desire for simplification and also with a view to reducing maintenance, in connection with the design of opposing torque rotors inspiration has been obtained from structures fundamentally initially intended specifically for lift rotors on which joints have been eliminated. Thus, constructions of main two-bladed rotors are known having a hollow spar with a single member of elliptical cross-section for two opposite blades fixed to the mast via slots. This spar made from resin-embedded fibre-glass is on either side of the mast combined by bonding with a fibre-glass covering and a honeycomb filling to form a composite blade. The control of these blades in incidence by twisting the spar over a fraction of its length at the socket for each blade results in high forces on the linkage necessitating the fitting of servo-controls which are expensive and require very careful maintenance.

In another construction of the main rotor having four blades opposing to one another in pairs, each pair of blades is carried by one and the same spar offering a rectangular cross-section and mounted on the mast via an upper and a lower plate having a receiving groove for said spar associated with intermediate members. Each blade has a shell with an end portion closely linked with the end portion of the spar whilst the portion of the said shell close to the mast is not attached to the spar and terminates with a widened portion. The flexible spar is made from a material having a very high modulus of elasticity at least equal to $2.11 \times 10^6$ kg/cm$^2$ such as boron filaments having a tungsten wire core and/or graphite filaments which are extremely expensive, the price being incompatible with the construction of a lightweight moderately priced construction.

The present invention has for its object a two-bladed opposing torque rotor arrangement for a lightweight moderately priced helicopter which eliminates the conventional tail rotor joints and eliminates the disadvantages of simplified rotors without joints indicated hereinbefore. This rotor has a flexible spar in the form of a blade embedded in its median portion between two plates which are integral with the rotor shaft and form the boss thereof, whilst the blades comprise two shaped shells surrounding each spar half, being connected to the latter solely in the end areas thereof leaving it free in its interior up to the boss. According to the invention each blade shell evolves progressively in cross-section in the root area of the blade from the blade section itself up to the formation of a cylindrical revolution sleeve which covers an also cylindrical flange and is fixed to the latter preferably by bonding.

Within each flange are fitted two flexible contacts on either side of the plates forming the boss, whereby the said pair of contacts elastially connect the flange to the boss. These contacts which are preferably formed from high elsticity silicone elastomer blocks advantageously have a symmetrical revolution shape offering a progressive tapering towards the central portion which aids their bending. The diameter of the base circles of these contacts can be substantially equal to their height.

Each cylindrical flange preferably has a circular rigidifying collar as well as a lateral lever permitting the control of the blade pitch and forming an integral pair of the flange or being joined to the latter.

The cylindrical shape of the flanges makes it possible to easily envelop the rotor boss assembly with a protective fairing formed by two substantially cylindrical half-shells covering the said flanges.

It can be seen that the cylindrical flanges of the rotor arrangement according to the invention, although being of simple design and construction advantageously fulfil the four following important functions:

They constitute the attachment members for the shells forming the blade and due to their cylindrical shape conjugate to the also cylindrical shape of the blade roots, they contribute to the reduction of the flat return moment of the blades and ensure an advantageous distribution of the localised support and pitch control forces in the hunting pseudo-joint;

they constitute rigid support members for the elastic blocks connecting them to the rotor boss and which permit by their flexibility the hunting and pitch variation of the blades;

they provide the attachment points for the pitch control rods;

they permit the easy installation of a boss fairing.

The construction and operation of the tail rotor arrangement according to the invention are very simple and considerably less onerous than those of known arrangements both as regards the manufacturing costs and the maintenance costs, whereby maintenance work on the present arrangement is almost completely eliminated.

The following description with reference to the attached drawings of non-limitative embodiments gives a better understanding of how the invention is put into practice.

FIG. 1 shows a plan view of a tail rotor according to the invention;

FIG. 2 shows a section along the plane II—II of FIG. 1;

FIG. 3 shows a section along the plane III—III of FIG. 2;

FIG. 4 shows a section along the plane IV—IV of FIG. 2;

FIG. 7 is a sectional view through the rotor adjacent its outer end.

Figure 5:
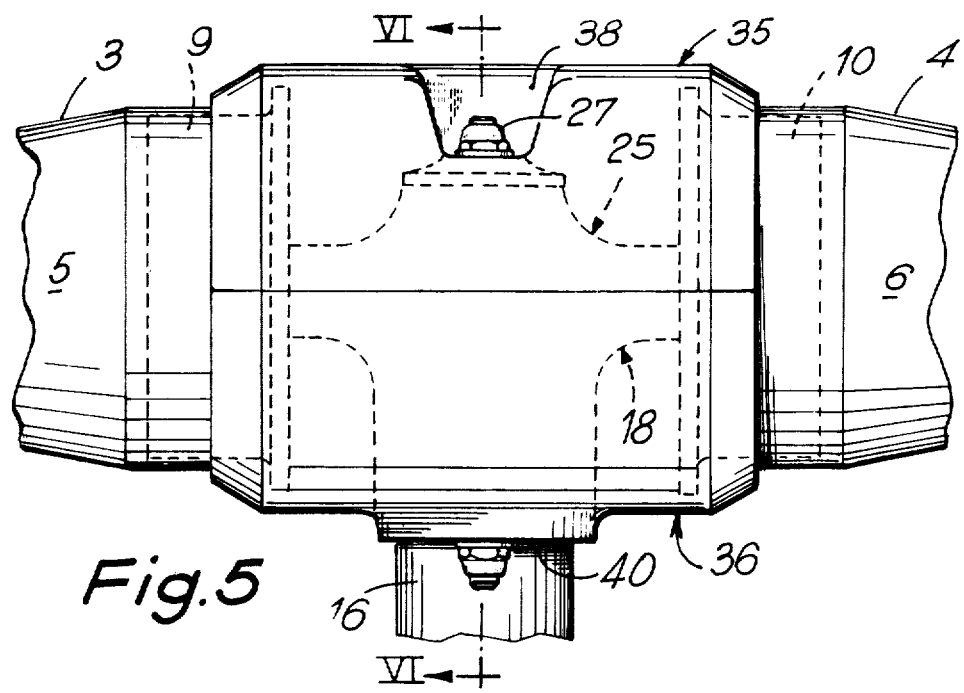
FIG. 5 shows in elevation the central portion of the rotor equipped with a protective fairing.

In the two-bladed helicopter tail rotor arrangement shown in the drawings, the rotor 1 substantially comprises a flexible and twistable spar 2 having a flat rectangular cross-section made from fibres having a high strength and low modulus of elasticity coated with a thermoset synthetic resin to form a blade which extends over the entire span of rotor 1. These fibres are glass-fibres whose use is made possible by the fact that the deformation of the first natural drag mode is of the type with two nodes. The movements of the center of the rotor which is located at an antinode of the deformation are in this case (two-bladed rotor) authorised by the flexibility of the rotor-carrying shaft as well as by that of the helicopter tail boom assembly. Under these conditions it is possible to dimension the spar 2 without having to fear excessive dynamic drag stresses by using only fibre-glass so that the first drag mode is above the nominal speed of the rotor, thereby avoiding any resonance on starting the rotor and in flight.

On the spar 2 and at each of its ends are fitted coverings constituted by two shells 3 and 4 shown partly in FIGS. 1 and 2 and forming with the said spar the two blades 5 and 6 of rotor 1. These two shells 3 and 4 made either from light metal or plastic reinforced with fibre glass are attached as seen in FIG. 7 by bonding to spar 2 over a certain length adjacent to its ends, whilst leaving it free on the side of its sockets or roots in such a way as to permit the hunting of the blades by bending of spar 2 and their pitch variation by its twisting.

The cross-sectional shape of the root of each blade (FIG. 2) evolves progressively towards the centre of the rotor from the blade section itself to finally form a cylindrical revolution sleeve 7 or 8. This blade root portion in the form of a sleeve covers and is made integral by bonding with a flange 9 or 10 also having a cylindrical shape and each equipped with a circular rigidifying collar 11,41.

A pitch control lever 12 connected to a not shown control mechanism is made in one piece with flange 9 (FIG. 1). As a variant, FIGS. 1 and 4 show flange 10 equipped with a lever 13 fitted to the collar 41 thereof by bolting 14.

The cylindrical shape of the blade root sleeves 7 and 8 and flanges 9 and 10 offers the significant advantage of a considerable reduction or elimination of the flat return of this portion of the blade due to the balanced distribution of the inertia around the longitudinal axis corresponding to the pitch rotation axis in such a way that the control forces are sufficiently reduced to avoid the necessity of fitting a servo-control for varying the pitch.

On the frustum-shaped end 15 of the shaft of rotor 16 (FIG. 2), is fitted the skirt 17 of a lower plate 18 wherein is provided a longitudinal groove 19 (FIG. 3). In the latter is fitted, resting on a lower spacer 20 the spar 2 whose centre point is located on the rotation axis of the tail rotor and constitutes the centre of a bore 21. This arrangement is such that it leaves a significant clearance between the end 22 of shaft 16 and the inner face of spacer 20. A second spacer 23 is arranged on spar 2 so as to be flush with the upper face 24 of plate 18. An upper plate 25 is supported on the latter and on spacer 23. The assembly of spacers 20 and 23 and of spar 2 is maintained locked between the lower plate 18 and upper plate 25 by means of a bolt 26 which engages in a tapped hole of the end of the shaft of rotor 16. In the same way the upper plate and the two spacers have a bore 21 located facing the bore in spar 2. Laterally and on either side of holding-down bolt 26 two threaded spindles 27 and 28 fix the two plates 18 and 25 constituting the rotor boss.

The spacers 20 and 23 are constituted by synthetic resin coated fibre-glass plates connected to the spar by polymerisaton. They are arranged over a limited length between the two plates of the boss so as to provide any unfavourable contact between spar and plates.

Between the cylindrical flange 9 (in the interior of the latter) and two flat extensions 29 and 30 of lower plate 18 and upper plate 25 respectively of the boss which grip spar 2 are mounted in the plane containing the longitudinal axis of spar 2 and the rotor rotation axis and parallel to the latter axis two elastic contacts carrying the general reference numeral 31. In the same way between flange 10 and two opposite extensions 32, 33 of the said plates are also provided two contacts 31. These contacts are constituted by high elasticity silicone elastomer blocks having a symmetrical revolution shape. The base circles of each contact 31 have a diameter which is substantially the same as the contact height which offers a progressive tapering towards its central portion facilitating the bending thereof.

The ends of contacts 31 are stuck to two thin metal members 34 which are embedded in corresponding recesses provided facing on the one hand the inside of flanges 9 and 10 and on the other in the flat extensions 29, 30, 33 and 34 of the boss. Contacts 31 are fitted in compression in their recesses so that they are maintained in place without any additional fixing and they can be replaced in operation without disassembly. They therefore support the blade root, mainly during starting or stopping the rotor when the centrifugal force is not adequate to stretch and stabilise the spar. Moreover, due to their great bending flexibility during pitch changes they permit significant relative displacements of flanges 9 and 10 relative to the boss without causing a too unfavourable flat return moment which would interfere with the controls. They also constitute an articulation point for the assembly of each blade 5, 6 during the bending of the spar 2 giving the conicity to the rotor. Finally these contacts are also intended to prevent couplings which are always possible between the hunting and pitch movements as well as to limit rotor instability substantially by increasing the rigidity in hunting of the assembly of each blade and its fixture.

Figure 6:
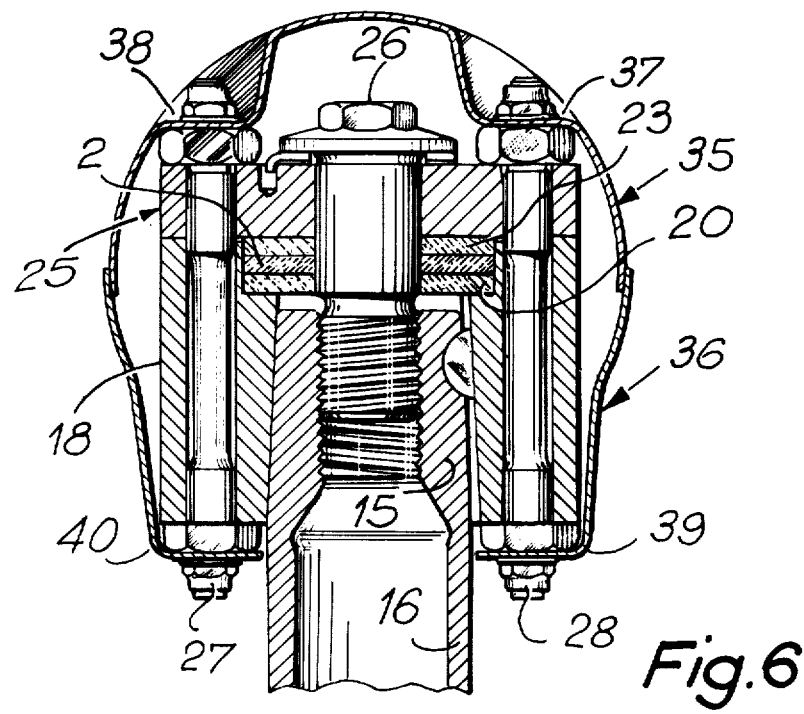
FIG. 6 shows a section along the plane VI—VI of FIG. 5.

The cylindrical shape of the two flanges 9 and 10 makes it advantageously possible to cover the rotor boss with an upper half shell 35 and a lower half shell 36. These two half shells having a substantially cylindrial shape cover (FIGS. 5 and 6) the two flanges 9 and 10 but leaving an adequate clearance to prevent contact during blade moements. Half-shell 35 has two inner stamped sections 37, 38 located laterally on either side of bolt 26, permitting the fixing thereof by bolting to the upper ends of the two spindles 27 and 28 for securing the two plates 18 and 25 of the boss. The lower half-shell 36 has two stamped sections 39, 40 permitting its fixing by bolting to the lower ends of spindles 27, 28.

Two not shown indentations are made in half-shells 35, 36 to the right of pitch levers 12 and 13 so as to permit passage and displacement. Such a fairing reduces drag on the boss and protects the latter by preventing any penetrating of water, dust or other foreign bodies into the housng of flexible spar 2 which could disturb the operation of the rotor by causing an unbalance or jamming.

What is claimed is:

1. A two-bladed tail rotor arrangement for lightweight moderately priced gryoplanes or helicopters comprising a strip-like flexible spar having a uniform rectangular cross-section, said spar being held at its median portion in a boss secured to the rotor shaft formed by a pair of plates having laterally opposed ends, a shaped blade shell surrounding each half of the spar and connected to the latter solely in the area of its outer end and extending freely up to the corresponding lateral end of the plates, each blade shell progressively evolving in cross-section from its outer end into a cylindrical blade root forming a sleeve surrounding the corresponding lateral end of the plates, a cylindrical flange inserted in and fixed to the sleeve of said blade root and an elastic contact interposed between the flange and the corresponding lateral end of said plates thereby connecting said blade root to said boss.

2. The arrangement according to claim 1, wherein the elastic contacts are positioned in the plane containing the longitudinal axis of the spar, the rotation axis of the root and parallel to the said latter axis.

3. The arrangement according to claim 1, wherein the contacts are symmetrical revolution blocks having a progressive tapering towards their central portion, the diameter of their base circles being substantially the same as their height.

4. The arrangement according to claim 1, wherein the elastic contacts are mounted in compression between said flange and the associated lateral ends of the plates.

5. The arrangement according to claim 4, wherein the face of each base circle of said contacts is bonded to a thin member embedded in a corresponding recess in said root blade and in the corresponding portions of the lateral ends of the plates forming the boss.

6. The arrangement according to claim 1, wherein the elastic contacts comprise high elasticity silicone elastomer blocks.

7. The arrangement according to claim 1, wherein each sleeve portion of the blade root is fixed by bonding to the outer surface of the corresponding cylindrical flange.

8. The arrangement according to claim 1, wherein each cylindrical flange has a circular rigidifying collar.

9. The arrangement according to claim 1, wherein at least one flange has an integral lateral extension constituting a pitch control lever.

10. The arrangement according to claim 1, wherein the rotor boss assembly is enveloped by a fairing formed by two substantially cylindrical half shells covering the cylindrical flange.

* * * * *